Figure 1:
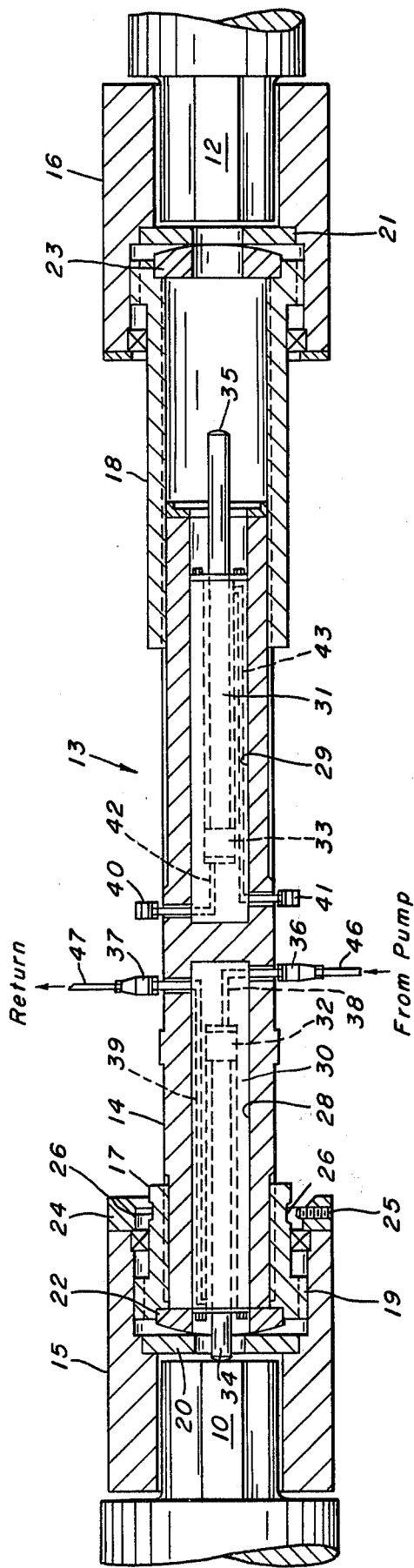

United States Patent [19]

Stull

[11] 4,003,219

[45] Jan. 18, 1977

[54] HYDRAULICALLY OPERATED RETRACTABLE SPINDLE

[75] Inventor: James T. Stull, Jackson Township, Butler County, Pa.

[73] Assignee: United States Steel Corporation, Pittsburgh, Pa.

[22] Filed: Apr. 21, 1975

[21] Appl. No.: 570,062

[52] U.S. Cl. .......................................... 64/23; 64/5; 64/9 R; 92/117 A; 403/15; 417/269

[51] Int. Cl.² .......................................... F16D 3/06

[58] Field of Search ............. 64/23, 9, 5; 92/117 A; 403/182, 15; 417/269

[56] References Cited

UNITED STATES PATENTS

| | | | |
|---|---|---|---|
| 2,508,564 | 5/1950 | Cardwell et al. | 92/117 A |
| 3,049,221 | 8/1962 | Kilbourne | 64/5 |
| 3,298,198 | 1/1967 | Winkler | 64/9 |
| 3,303,668 | 2/1967 | Winkler | 64/9 |
| 3,760,920 | 9/1973 | Delfeld | 64/23 |

Primary Examiner—Samuel Scott
Assistant Examiner—Randall Heald
Attorney, Agent, or Firm—Walter P. Wood

[57] ABSTRACT

A retractable spindle for connecting a drive to a driven instrumentality, such as a roll. The spindle includes an axially movable shaft which has self-contained hydraulic means for moving it axially to disconnect it from the driven instrumentality or connect it thereto. This arrangement avoids the need for external mechanical linkages used heretofore for retracting a spindle.

4 Claims, 2 Drawing Figures

U.S. Patent  Jan. 18, 1977  4,003,219

HYDRAULICALLY OPERATED RETRACTABLE SPINDLE

This invention relates to an improved retractable spindle for mechanically connecting a drive to a driven instrumentality.

Although the invention is not thus limited, the spindle is particularly useful for connecting a drive to a driven work roll of a metal rolling mill, for example, in an in-line roll stand of a continuous-casting machine. Such work rolls are subject to hard usage and they require frequent removal and replacement. Before a roll can be removed, it is necessary to disconnect and retract the spindle through which it is driven. Heretofore relatively complex external mechanical linkages have been used for retracting such spindles. These linkages have not been satisfactory, mainly for the reason that mill scale lodges in exposed pivotal joints and prevents proper operation. Also radiant heat and continual splashing of cooling water from the rolling operation prevents proper lubrication of the parts.

An object of my invention is to provide an improved retractable spindle in which the retracting mechanism is housed within the spindle itself and hence is protected from deleterious effects of the surrounding environment.

Figure 2:
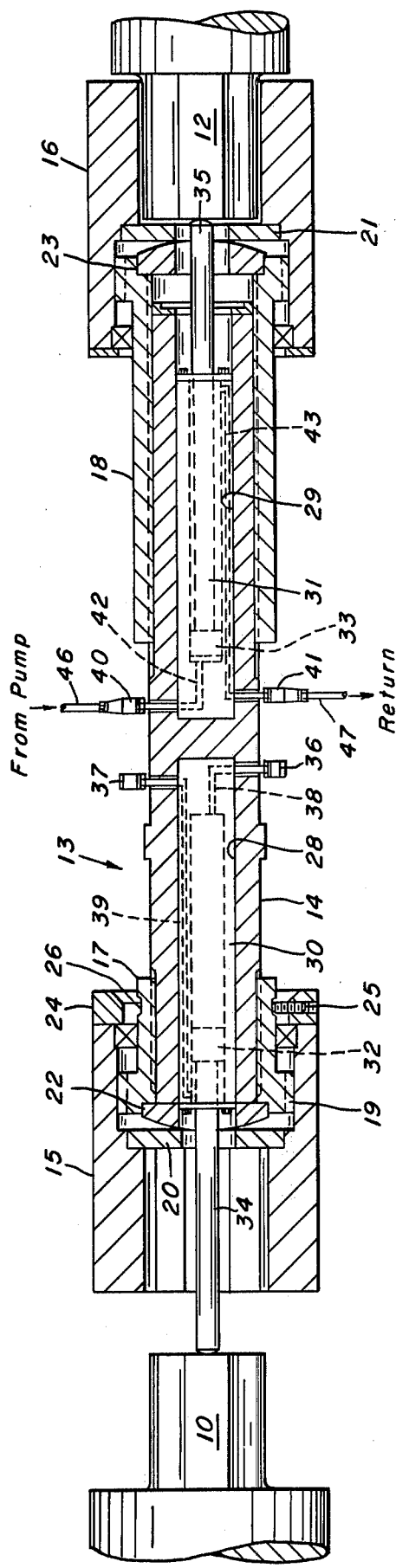

A further object is to provide an improved retractable spindle in which the retracting mechanism is self-contained, and hydraulically operated, thereby avoiding need for exposed mechanical linkages. In the drawing:

FIG. 1 is a vertical sectional of my improved spindle with the parts in the position they occupy for driving a roll or other instrumentality; and FIG. 2 is a similar view, but with the parts in the position they occupy when the spindle is retracted. The drawing shows the neck 10 of a conventional work roll, an output shaft 12 of a driving instrumentality, and a retractable spindle 13 constructed in accordance with my invention connecting the output shaft and the roll neck. Spindle 13 comprises an axially movable shaft 14 and first and second couplings 15 and 16 which are located at opposite ends of shaft 14 and receive the roll neck 10 and the output shaft 12 respectively. A hub 17 is fixed to the end portion of the shaft 14 nearer the roll neck. A hub 18 is slidably keyed to the end portion of the shaft 14 nearer the output shaft 12. Hub 17 carries crowned gear teeth 19 which mesh with gear teeth within the interior of the coupling 15. The crowned gear teeth enable the coupling to move bodily with the roll neck 10 when the roll is raised or lowered, as known in the art. Hub 18 is keyed within the coupling 16. The couplings 15 and 16 carry annular backup plates 20 and 21 respectively. The hubs 17 and 18 carry annular thrust plates 22 and 23 respectively which abut the backup plates.

Normally the coupling 15 is free to move axially relative to the hub 17 and shaft 14 to the extent needed for thermal expansion and contraction and also to permit the coupling to move bodily with the roll neck 10, but the coupling must be fixed temporarily to the hub to enable the coupling to be disconnected from the roll neck 10. For this purpose the coupling carries a collar 24 in which set screws 25 are threadedly engaged. The hub 17 has a circumferential groove 26 for receiving the set screws when tightened.

The roll and drive ends of the spindle shaft 14 have axial bores 28 and 29 respectively in which I mount doubleacting hydraulic cylinders 30 and 31. The cylinders have respective pistons 32 and 33 which carry piston rods 34 and 35 extending from opposite ends of the shaft. The midportion of shaft 14 carries a first pair of hydraulic fittings 36 and 37 which communicate with the inner and outer ends of cylinder 30 via passages 38 and 39 respectively in the cylinder wall. The midportion of the shaft carries a second pair of hydraulic fittings 40 and 41 which communicate with the inner and outer ends of cylinder 31 via passages 42 and 43 in the wall of the latter cylinder.

When the spindle 13 is to be disconnected from the roll neck 10, I first tighten the set screws 25, as already explained. The set screws not only fix the coupling 15 to the hub 17, but also hold the coupling in alignment with the shaft 14. Next I connect lines 46 and 47 to the fittings 36 and 37 respectively. Line 46 leads from a pump or other source of hydraulic fluid under pressure. Line 47 is a return. Admitting fluid to the inner end of cylinder 30 forces piston rod 34 against the end of the roll neck 10 and thus forces shaft 14, hub 17 and coupling 15 to the right. The shaft slides axially into the hub 18 to the position shown in FIG. 2. The coupling 15 clears the roll neck, and the roll can be freely lifted out for maintenance, etc. Before reconnecting the spindle to the roll, I reverse the connections of lines 46 and 47 to the fittings 36 and 37 and thus retract the piston 32 and piston rod 34 into cylinder 30.

To return the spindle to its roll-driving position, I connect lines 46 and 47 to the fittings 40 and 41 respectively and admit hydraulic fluid to the inner end of cylinder 31. This forces the piston rod 35 against the end of the output shaft 12 and thus forces shaft 14, hub 17 and coupling 15 to the left relative to the hub 18. The coupling 15 again engages the roll neck 10, after which I loosen the set screws 25. Before again retracting the spindle, I reverse the connections of lins 46 and 47 to the fittings 40 and 41 to retract the piston 33 and piston rod 35 into the cylinder 31.

From the foregoing description, it is seen that my invention affords a fully self-contained hydraulically operated retractable spindle for connecting a drive to a driven instrumentality. The invention avoids need for external mechanical linkages, with their attendant problems, to disconnect the spindle from the driven instrumentality. Although the spindle is particularly useful for driving a roll, it is apparent that its use is not thus limited.

I claim:

1. The combination, with driven and driving instrumentalities, of a removable spindle connecting said instrumentalities for transmitting rotational movement of said driving instrumentality to said driven instrumentality, said spindle comprising:
   a shaft;
   first and second hubs mounted on said shaft adjacent opposite ends thereof to rotate therewith, said shaft being axially movable with respect to said second hub;
   first and second couplings joining the respective hubs with said driven and driving instrumentalities;
   first and second hydraulic cylinders within said shaft near the ends which are adjacent said first and second hubs respectively; and
   normally retracted first and second reciprocable pistons and piston rods within the respective cylinders;

said first piston rod bearing against said driven instrumentality for pushing said shaft toward said driving instrumentality when projected from said first cylinder and disengaging said first coupling from said driven instrumentality;

said second piston rod bearing against said driving instrumentality for pushing said shaft toward said driven instrumentality when projected from said second cylinder and re-engaging said first coupling with said driven instrumentality.

2. A spindle as defined in claim 1 in which said first coupling normally is movable axially with respect to said first hub, and further comprising means for temporarily fixing said first coupling to said first hub, whereby axial movement of said shaft moves said first coupling axially.

3. A spindle as defined in claim 1 further comprising annular thrust plates carried by said hubs and abutting the respective couplings, said plates having openings through which said piston rods extend.

4. A spindle as defined in claim 1 in which said shaft has axial bores extending from each end, and said cylinders are housed within said bores.

* * * * *